United States Patent
Akiyama (10) Patent No.: US 11,874,499 B2
(45) Date of Patent: Jan. 16, 2024

(54) REINFORCEMENT SLEEVE, AND REINFORCEMENT STRUCTURE AND REINFORCEMENT METHOD FOR OPTICAL FIBER CONNECTION PART

(71) Applicant: FURUKAWA ELECTRIC CO., LTD., Tokyo (JP)

(72) Inventor: Tomohiro Akiyama, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 101 days.

(21) Appl. No.: 17/576,341

(22) Filed: Jan. 14, 2022

(65) Prior Publication Data

US 2022/0137297 A1     May 5, 2022

Related U.S. Application Data

(63) Continuation of application No. PCT/JP2020/035748, filed on Sep. 23, 2020.

(30) Foreign Application Priority Data

Oct. 1, 2019    (JP) ................. 2019-181579

(51) Int. Cl.
     G02B 6/255      (2006.01)
     G02B 6/44      (2006.01)

(52) U.S. Cl.
     CPC ......... *G02B 6/2558* (2013.01); *G02B 6/2553* (2013.01); *G02B 6/2555* (2013.01); *G02B 6/4476* (2013.01)

(58) Field of Classification Search
     CPC .. G02B 6/2558; G02B 6/2553; G02B 6/2555; G02B 6/4476
     See application file for complete search history.

(56) References Cited

U.S. PATENT DOCUMENTS 5,832,162 A * 11/1998 Sarbell ................. G02B 6/2558
                                                 385/99
6,728,451 B2 * 4/2004 Kordahi ............... G02B 6/4471
                                                 385/100

(Continued)

FOREIGN PATENT DOCUMENTS

JP     S62-12102 U     1/1987
JP     S62-12103 U     1/1987

(Continued)

OTHER PUBLICATIONS

International Search Report issued in PCT Patent Application No. PCT/JP2020/035748 dated Nov. 10, 2020.

(Continued)

*Primary Examiner* — Ryan A Lepisto
*Assistant Examiner* — Erin D Chiem
(74) *Attorney, Agent, or Firm* — MARSHALL, GERSTEIN & BORUN LLP (57) ABSTRACT

A reinforcement sleeve is a member for reinforcing a connection part of an optical fiber tape core wire, and comprises a heat-shrinkable tube, a heat-meltable member, a tension member, and the like. The heat-shrinkable tube is a cylindrical member. The tension member is a rod-shaped member. The tension member and the heat-meltable member are inserted in the heat-shrinkable tube. The heat-meltable member is disposed above the tension member. The tension member is approximately circular or approximately elliptical in a cross section perpendicular to the longitudinal direction of the reinforcement sleeve. More specifically, the surface on the heat-meltable member side of the tension member is formed to have an arc-shaped convex curved surface in a cross section perpendicular to the longitudinal direction of the tension member.

14 Claims, 7 Drawing Sheets

(56) References Cited

U.S. PATENT DOCUMENTS

| | | | |
|---|---|---|---|
| 8,408,818 B2 * | 4/2013 | Homma | G02B 6/2558 385/99 |
| 11,226,449 B2 * | 1/2022 | Wada | G02B 6/2558 |
| 2004/0247261 A1 * | 12/2004 | Sato | G02B 6/2558 385/99 |
| 2018/0074261 A1 * | 3/2018 | Burek | G02B 6/25 |

FOREIGN PATENT DOCUMENTS

| | | | | |
|---|---|---|---|---|
| JP | S62-22608 U | * | 2/1987 | |
| JP | S62-22609 U | | 2/1987 | |
| JP | S62-35305 U | | 3/1987 | |
| JP | S64-32208 A | | 2/1989 | |
| JP | 2005-24921 A | | 1/2005 | |
| WO | WO-03/019261 A1 | | 3/2003 | |
| WO | WO-03019261 A1 | * | 3/2003 | G02B 6/2558 |

OTHER PUBLICATIONS

Office Action issued in Japanese Patent Application No. 2019-181579 dated Aug. 11, 2020.

Office Action issued in Japanese Patent Application No. 2019-181579 dated Sep. 9, 2021.

* cited by examiner

REINFORCEMENT SLEEVE, AND REINFORCEMENT STRUCTURE AND REINFORCEMENT METHOD FOR OPTICAL FIBER CONNECTION PART

TECHNICAL FIELD

The present invention relates to a reinforcement sleeve, and a reinforcement structure and a reinforcement method for an optical fiber connection part using the reinforcement sleeve.

BACKGROUND

It is known that a reinforcement sleeve is provided at a fusion connection part for reinforcement when fusion connecting optical fiber core wires with each other, for example.

Various types of such reinforcement sleeves have been devised. For example, Japanese Unexamined Patent Application Publication No. 1989-32208 (JP-A-1989-32208) discloses a reinforcement sleeve in which a hot melt adhesive tube and a tension member are inserted into a heat-shrinkable tube.

SUMMARY OF THE INVENTION

An optical fiber tape core wire, which includes a plurality of optical fiber core wires that are placed side by side and bonded with each other, has been used in recent years as an optical fiber for carrying mass quantity of data at high speed. The optical fiber tape core wire also facilitates packaging inside a cable and simplifies operations. In addition to the optical fiber tape core wire in which the plurality of optical fiber core wires are disposed side by side, and fixed and bonded over an entire length using resin, an optical fiber ribbon including the plurality of side-by-side optical fiber core wires bonded with each other at intervals in a longitudinal direction has also been used. The intermittent bonding between optical fiber core wires improves fiber density, reduces transmission loss due to bending, and facilitates making a single core fiber. Hereinafter, optical fiber tape core wires and optical fiber ribbons will be collectively referred to as an optical fiber tape etc. for simplification.

Figure 5:
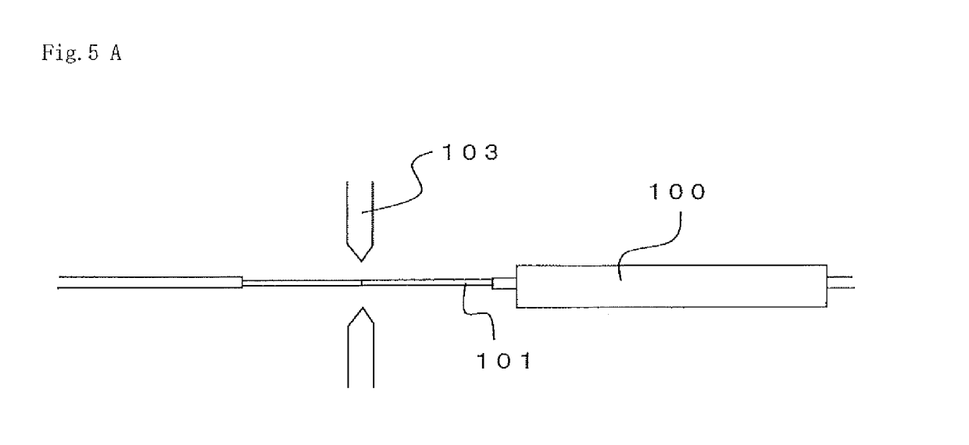
FIG. 5A is a view showing a connection step of optical fiber core wires 101 using a reinforcement sleeve 100.
FIG. 5B is a view showing a connection step of the optical fiber core wires 101 using the reinforcement sleeve 100.
FIG. 5C is a view showing a connection step of the optical fiber core wires 101 using the reinforcement sleeve 100.

FIG. 5A to FIG. 5C show steps for reinforcing a connection part of optical fiber tapes etc. using a reinforcement sleeve. First, as shown in FIG. 5A, optical fiber core wires 101 that are disposed facing each other are butted to each other and fusion bonded with each other by discharging electricity from an electrode 103. At this time, a reinforcement sleeve 100 is put aside on a side of one of the optical fiber core wires 101.

Next, as shown in FIG. 5B, the reinforcement sleeve 100 is moved to the connection part of the optical fiber core wires 101 (an arrow C in the drawing). Then, as shown in FIG. 5C, the reinforcement sleeve 100 is heated and shrunk so that the reinforcement sleeve 100 and the plurality of the optical fiber core wires 101 are unified as one body, thus reinforcing the connection part of the plurality of the optical fiber core wires 101.

Figure 6:
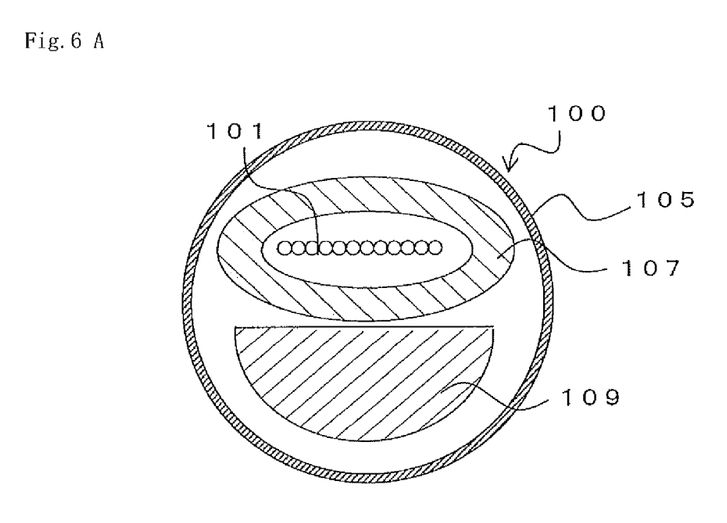
FIG. 6A is a view showing a reinforcement step for a connection part between the optical fiber core wires 101 using the reinforcement sleeve 100, and is a cross-sectional view of the reinforcement sleeve 100 before shrinking.
FIG. 6B is a view showing a reinforcement step for the connection part between the optical fiber core wires 101 using the reinforcement sleeve 100, and is an ideal cross-sectional schematic view of the reinforcement sleeve 100 after shrinking.
FIG. 6C is a view showing a reinforcement step for the connection part between the optical fiber core wires 101 using the reinforcement sleeve 100, and is an actual cross-sectional schematic view of the reinforcement sleeve 100 after shrinking.

FIG. 6A is a cross-sectional view of a state shown in FIG. 5B. As mentioned above, the reinforcement sleeve 100 includes a heat-meltable member 107 and a tension member 109 that are inserted into a heat-shrinkable tube 105. The heat-meltable member 107 is in a cylindrical shape, and the connection part of the side-by-side optical fiber core wires 101 is provided so as to pass through the heat-meltable member 107. Outer jackets of the optical fiber core wires 101 that are to be passed through the heat-meltable member 107 are removed before the connection.

FIG. 6B is an ideal schematic view of a structure of the reinforcement sleeve 100 after heating. The heat-shrinkable tube 105 shrinks by heating. Also, the heat-meltable member 107 softens by heat, filling up space inside the heat-shrinkable tube 105 after shrinking, and becomes unified with the plurality of the optical fiber core wires 101 and the tension member 109.

Here, an upper surface of the tension member 109 (on a side of the optical fiber core wires 101) is often formed as a plane. It is expected for the plurality of the optical fiber core wires 101 to align with the plane of the upper surface of the tension member 109, and to be unified with the tension member 109 and the heat-meltable member 107.

Figure 6C:
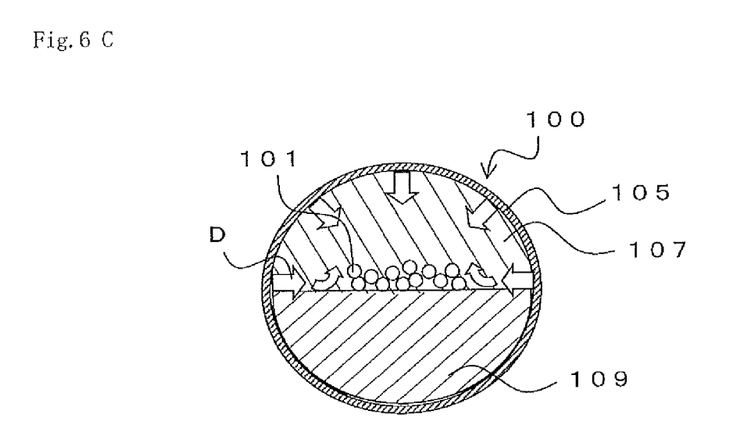

However, in reality, as shown in FIG. 6C, when the heat-shrinkable tube 105 shrinks, the heat-meltable member 107 receives force from its surroundings (arrows D in the drawing), and thus the plurality of the optical fiber core wires 101 receive side pressure. As mentioned above, although the optical fiber core wires 101 are expected to align straightly with the plane portion of the upper surface of the tension member 109, the side pressure, particularly in a width direction, disarranges the optical fiber core wires 101. For example, part of the optical fiber core wires 101 move away from the tension member 109 to be gathered around the center.

Such tendency is more noticeable in particular as distance between the optical fiber core wires 101 (a pitch) decreases or the number of the optical fiber core wires increases. This tendency is also more noticeable when a diameter of an optical fiber bare wire is small, which reduces rigidity. Also, this tendency is further noticeable in an intermittently-bonded optical fiber ribbon, in which the plurality of the optical fiber core wires are bonded at intervals in a longitudinal direction.

If the alignment of the optical fiber core wires 101 is disarranged as above, transmission loss in part of the optical fiber core wires 101 may increase. For this reason, the optical fiber core wires 101 are to be always unified in a fixed form, without disarrangement of the alignment of each of the optical fiber core wires 101, when shrinking the heat-shrinkable tube 105.

In response to the above issue, it is an object of the present invention to provide a reinforcement sleeve and the like that can efficiently reinforce a connection part of optical fiber tapes etc.

To achieve the above object, a first aspect of the present invention is a reinforcement sleeve for collectively reinforcing connection parts of a plurality of optical fiber core wires that are disposed side by side. The reinforcement sleeve includes a heat-shrinkable tube, and a heat-meltable member and a tension member that are inserted into the heat shrinkable tube. A surface of the tension member on a side of the heat-meltable member is formed to have a convex curved surface in a cross section perpendicular to a longitudinal direction of the tension member.

Preferably, a radius of curvature of the convex curved surface is larger than a radius of curvature of an inner surface of the heat-shrinkable tube.

Preferably, a cross-sectional shape of the tension member is elliptical.

Each end portion of the tension member may have a convex portion formed.

According to the first aspect of the present invention, the surface of the tension member on a side where the optical fiber core wires are disposed is formed to have an arc-shaped convex curved surface in a cross section perpendicular to the longitudinal direction of the tension member. Thus, when the optical fiber core wires, which are disposed side by side, receive side pressure from both sides in a width direction, a force component that presses each of the optical fiber core wires toward the tension member is applied. This can suppress floating of the optical fiber core wires from the tension member and prevent disarrangement, so that each of the optical fiber core wires can be disposed more stably along the upper surface shape of the tension member. As a result, an increase or a variation in transmission loss in each of the optical fiber core wires can be suppressed.

In particular, if the radius of curvature of the curved surface of the tension member is larger than the radius of curvature of the inner surface of the heat-shrinkable tube, the optical fiber core wires can be arranged along the gently curved surface.

Also, by making the tension member into an elliptical cross-sectional shape, the tension member can have an enough width in a direction in which the optical fiber core wires are arranged side by side, and it is also possible to suppress an increase in a cross-sectional area occupied by the tension member inside the heat-shrinkable tube.

Also, the convex portion having a level difference, which is formed on each side of the tension member, can prevent the heat-meltable member from flowing beneath the tension member when the heat-meltable member melts. This enables to keep an amount of the heat-meltable member, which is used to press the optical fiber core wires against the tension member, constant, and to achieve a stable shrunk state.

A second aspect of the present invention is a reinforcement structure for a connection part of optical fibers using the reinforcement sleeve according to the first aspect of the present invention, in which the heat-meltable member covers a connection part connecting optical fiber ribbons with each other. The optical fiber ribbon includes a plurality of optical fiber core wires that are bonded at intervals in a longitudinal direction, and the plurality of the optical fiber core wires forming the optical fiber ribbon are arranged along the curved surface of the tension member.

Preferably, the number of the plurality of the optical fiber core wires forming the optical fiber ribbon is 12 or more.

Preferably, a pitch between the plurality of the optical fiber core wires is 200 μm or less.

Preferably, an outer diameter of a glass fiber of the optical fiber core wire is 110 μm or less.

Preferably, an outer diameter of the optical fiber core wire is 200 μm or less.

According to the second aspect of the present invention, the plurality of the optical fiber core wires forming the optical fiber ribbon are arranged along the curved surface of the tension member, and thus a variation in the transmission loss in each optical fiber core wire can be suppressed.

The above effects are particularly remarkable when the number of the plurality of the optical fiber core wires forming the optical fiber ribbon is 12 or more. Also, the above effects are remarkable when the pitch between the plurality of the optical fiber core wires is 200 μm or less. Also, the above effects are remarkable when the outer diameter of a glass fiber of the optical fiber core wire is 110 μm or less. Also, the above effects are remarkable when the outer diameter of the optical fiber core wire is 200 μm or less.

A third aspect of the present invention is a reinforcement method for an optical fiber connection part using the reinforcement sleeve according to the first aspect of the present invention. The method includes fusion bonding optical fiber ribbons in which a plurality of optical fiber core wires are bonded at intervals in a longitudinal direction; moving the reinforcement sleeve so as to cover the connection part of the optical fiber ribbons; heating the heat-shrinkable tube and the heat-meltable member so as to shrink the heat-shrinkable tube and melt the heat-meltable member at the same time; and cooling the plurality of the optical fiber core wires in a state in which the plurality of the optical fiber core wires are arranged along a curved surface of the tension member so that the tension member and the connection part of the plurality of the optical fiber core wires are unified as one body.

According to the third aspect of the present invention, it is possible to obtain an efficient reinforcement structure for an optical fiber connection part, which has a stable transmission performance. Similarly to the second aspect, the third aspect of the present invention is also effective when the number of the plurality of the optical fiber core wires forming the optical fiber ribbon is 12 or more, the pitch between the plurality of the optical fiber core wires is 200 μm or less, the outer diameter of a glass fiber of the optical fiber core wire is 110 μm or less, or the outer diameter of the optical fiber core wire is 200 μm or less.

The present invention can provide a reinforcement sleeve and the like that can efficiently reinforce a connection part of optical fiber tapes etc.

DETAILED DESCRIPTION

Figure 1:
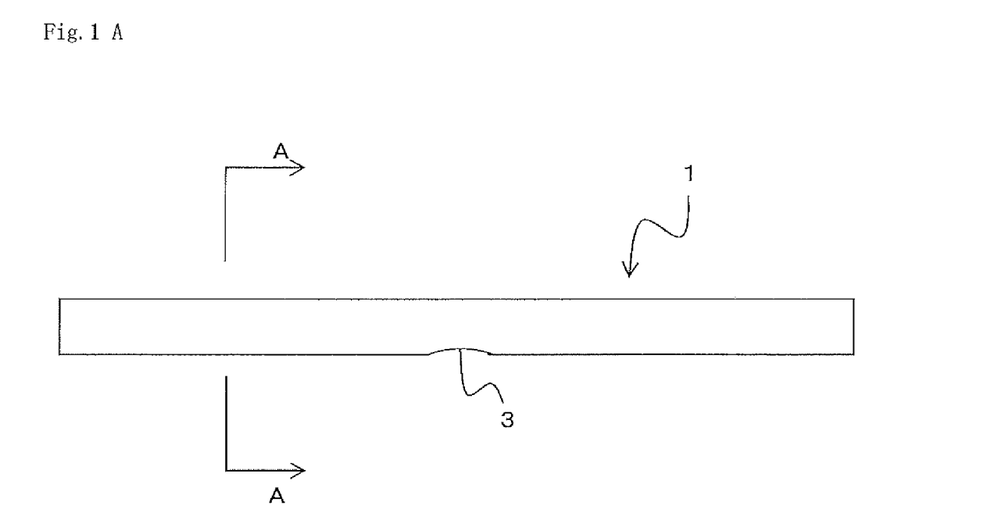
FIG. 1A is a side view showing a reinforcement sleeve 1.
FIG. 1B is a cross-sectional view taken along A-A line in FIG. 1A.

Hereinafter, embodiments of the present invention will be described with reference to the accompanying drawings. FIG. 1A is a side view of a reinforcement sleeve 1, and FIG. 1B is a cross-sectional view taken along A-A line in FIG. 1A. The reinforcement sleeve 1 is a member that collectively reinforces connection parts of a plurality of optical fiber core wires that are disposed side by side. The reinforcement sleeve 1 includes a heat-shrinkable tube 5, a heat-meltable member 7, a tension member 9, and so on.

The heat-shrinkable tube 5 is a cylindrical member having an approximately circular cross section. The heat-shrinkable tube 5 is made of polyethylene resin, for example.

The heat-meltable member 7 is in a cylindrical shape having an approximately circular or elliptical cross section. The heat-meltable member 7 is made of ethylene-vinyl acetate resin, for example. The heat-meltable member 7 melts preferably at a temperature lower than a heat-shrinking temperature of the heat-shrinkable tube 5.

The tension member 9 is a rod-shaped member. The tension member 9 is made of steel, carbon, glass, or ceramics, for example. The tension member 9 and the heat-meltable member 7 are inserted into the heat-shrinkable tube 5. A rivet-head portion 3 is formed at a part of the heat-shrinkable tube 5 to prevent the tension member 9 and the heat-meltable member 7 from falling.

If the tension member 9 inclines in the cross section, a position of a curved surface of the tension member 9 may shift in relation to a position of the heat-shrinkable tube 5, and this may cause the tension member 9 to lose its balance. In such a case, non-uniform force presses the optical fiber core wires against the tension member 9, which may deteriorate an alignment of the optical fiber core wires. However, the rivet-head 3, which prevents the inclination of the tension member 9, is effective in maintaining the arrangement of the tension member 9 and the optical fiber core wires.

The heat-meltable member 7 is disposed above the tension member 9. Also, the tension member 9 has an approximately circular or elliptical cross section perpendicular to a longitudinal direction of the reinforcement sleeve 1. That is, a surface of the tension member 9 on a side of the heat-meltable member 7 (an upper part of the drawing) is formed to have an arc-shaped convex curved surface in a cross section perpendicular to a longitudinal direction of the tension member 9.

The cross-sectional shape of the tension member 9 may not be circular or elliptical. However, it is preferable that a radius of curvature R of the convex curved surface of the tension member 9 on the side of the heat-meltable member 7 (a radius of curvature of a center part in a width direction of the convex curved surface of the tension member 9, for example) is larger than a radius of curvature of an inner surface of the heat-shrinkable tube before shrinking (a radius of curvature in a case of a circular shape). Also, a width of the tension member 9 is preferably larger than a width of an optical fiber tape etc., which will be described below. That is, the tension member 9 is preferably in a flat shape in a width direction thereof. Also, a surface of the tension member 9 on an opposite side of the heat-meltable member 7 (a lower part of the drawing) may not be curved, or may have a different radius of curvature from the upper surface.

The radius of curvature R of the convex curved surface of the tension member 9 may vary in the width direction. In such a case, the radius of curvature R at the center part of the width direction is preferably larger than the radius of curvature R at an end portion of the width direction. Furthermore, the tension member 9 preferably has the convex curved surface at least at a center portion of the longitudinal direction (a part where parts of optical fibers from which resin coatings are removed are disposed, including the fusion-bonded connection part of the optical fibers). That is, the upper surface side of the tension member 9 on end parts of the longitudinal direction may be flat-shaped.

Figure 2:
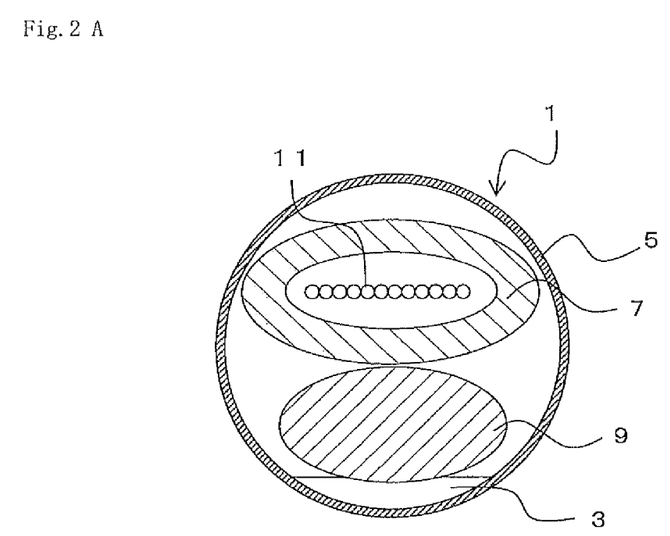
FIG. 2A is a view showing a reinforcement step for a connection part between optical fiber core wires 11 using the reinforcement sleeve 1, and is a cross-sectional view of the reinforcement sleeve 1 before shrinking.
FIG. 2B is a view showing the reinforcement step for the connection part between the optical fiber core wires 11 using the reinforcement sleeve 1, and is a cross-sectional view of the reinforcement sleeve 1 after shrinking.

Next, a reinforcement method for the optical fiber connection part using the reinforcement sleeve 1 will be described. FIG. 2A and FIG. 2B are views illustrating reinforcement steps for the connection part between optical fiber core wires 11 forming an optical fiber tape etc. First, similarly to the above-mentioned FIG. 5A to FIG. 5C, outer jackets of end portions of the optical fiber core wires 11 are removed for a predetermined length, and then the end portions are butted together and fusion bonded to each other. At this time, the plurality of the optical fiber core wires 11 on a side of one of the optical fiber core wires are inserted into the heat-meltable member 7 of the reinforcement sleeve 1, and the reinforcement sleeve 1 is put aside on the side of the one of the optical fiber core wires.

Next, as shown in FIG. 2A, the reinforcement sleeve 1 is moved so as to cover the connection part between the plurality of the optical fiber core wires 11. Then, the heat-shrinkable tube 5 and the heat-meltable member 7 are heated so that the heat-shrinkable tube 5 shrinks and the heat-meltable member 7 melts.

FIG. 2B is a cross-sectional view showing a state in which the heat-shrinkable tube 5 shrinks and the heat-meltable member 7 melts. The heat-meltable member 7 flows down along the tension member 9 when melted. At this time, since the tension member 9 has the convex curved surface formed on the side of the optical fiber core wires 11, the optical fiber core wires 11, together with the heat-meltable member 7, also move toward the tension member 9, making a side-by-side alignment direction curve along the curved surface of the tension member 9. At this time, as mentioned above, because of the shrinking of the heat-shrinkable tube 5, the heat-meltable member 7 and the side-by-side optical fiber core wires 11 receive side pressure (arrows B in the drawing).

As mentioned above, since the side-by-side alignment direction of the optical fiber core wires 11 curves along the curved surface of the tension member 9, the side pressure to each of the optical fiber core wires 11 generates a force component in a direction perpendicular to the curved surface of the tension member 9. This makes the optical fiber core wire 11 float up from the tension member 9, thus preventing the disarrangement. In reality, the optical fiber core wires 11 are not in contact with the tension member 9, and the heat-meltable member 7 enters into space between the optical fiber core wires 11 and the tension member 9.

The heating is stopped at this state and the tension member 9 and the connection part of the optical fiber core wires 11 are unified as one body so that the heat-meltable member 7 covers the connection part of the optical fiber core wires 11. Thus, a reinforcement structure for the connection part of the optical fibers, in which the optical fiber core wires 11 forming the optical fiber tape etc. are disposed along the curved surface of the tension member 9, can be obtained.

In particular, if the optical fiber tape etc. is an optical fiber ribbon, in which a plurality of optical fiber core wires are bonded at intervals in a longitudinal direction and adjacent bonded portions are arranged in a zigzag arrangement or in a step form in the longitudinal direction, for example, the arrangement of the optical fiber core wires 11 is likely to be disarranged due to the side pressure.

Figure 3:
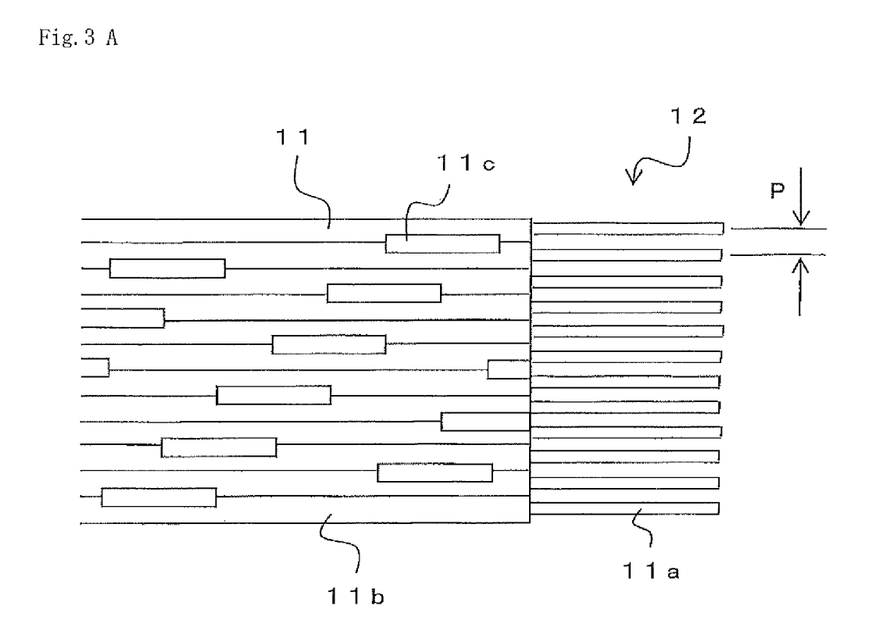
FIG. 3A is a view showing an optical fiber ribbon 12.
FIG. 3B is a view showing a state in which the optical fiber ribbons 12 are butted to each other.

FIG. 3A is a view showing an optical fiber ribbon 12. As mentioned above, the optical fiber ribbon 12 includes the plurality of the optical fiber core wires 11 that are arranged side by side and bonded at intervals in the longitudinal direction at bonding portions 11c. The optical fiber core wire 11 includes a glass fiber 11a inside and a resin coating 11b that is disposed on an outer periphery of the glass fiber 11a. The resin coating 11b at an end portion of the optical fiber core wire 11 is removed when connecting the optical fiber core wires 11. Here, a pitch P of the optical fiber core wire 11 is almost equal to an outer diameter of the optical fiber core wire 11.

FIG. 3B is a schematic view showing a state in which the optical fiber ribbons 12 are butted and fusion bonded with each other. The optical fiber ribbon 12 has intermittent bonding portions that fix the optical fiber core wires 11 with each other. Thus, the optical fiber ribbon 12 has longer independent parts of the optical fiber wires 11 than a traditional optical fiber tape, in which the optical fiber core wires 11 are fixed over an entire length thereof. For this reason, the arrangement of the optical fiber core wires 11 of the optical fiber ribbon 12 has higher degree of freedom, which may cause position shifting of the optical fiber core wires 11 (the glass fibers 11a) when butting the glass fibers 11a to each other (a section E in the drawing). Thus, the present embodiment is particularly effective for the intermittently bonded optical fiber ribbon in which the plurality of the optical fiber core wires 11 are bonded at intervals in the longitudinal direction thereof.

Also, the disarrangement due to the side pressure is likely to occur often in a case with the small outer diameter of the optical fiber core wire 11 (the outer diameter of the resin coating 11b). Thus, the present embodiment is particularly effective in a case where each optical fiber core wire 11 forming the optical fiber tape etc. has the outer diameter of 225 µm or less. It is further effective as the outer diameter of the optical fiber core wire is decreased to 200 µm or less, or even to 170 µm or less.

Moreover, the glass fiber 11a without the resin coating 11b traditionally has the outer diameter of 125 µm. However, the thinner such the glass fiber 11a becomes, the smaller the rigidity of the optical fiber core wire 11 becomes, which may cause the disarrangement of the glass fibers 11a due to the side pressure. The present embodiment is particularly effective in a case where the outer diameter of each of the glass fibers 11a forming the optical fiber tape etc. is 110 µm or less.

Moreover, if the pitch P between the optical fiber core wires 11 is smaller than a traditional pitch of 250 µm, it is necessary to prevent the disarrangement of the optical fiber core wires 11 with certainty, otherwise issues such as the glass fibers 11a coming into contact with each other are likely to occur. Thus, the present embodiment is particularly effective in a case where the pitch P between the optical fiber core wires 11 is 225 µm or less. In particular, if the pitch P between the optical fiber core wires 11 is decreased to 200 µm or less, or even to 170 µm or less, the possibility of contact or intersection between the glass fibers 11a increases, and thus the present embodiment is furthermore effective.

Also, the more the number of the optical fiber core wires 11 forming the optical fiber tape etc., the more likely the disarrangement of the optical fiber core wires 11 due to the side pressure occurs. Thus, the present embodiment is particularly effective in a case where the number of the plurality of the optical fiber core wires 11 forming the optical fiber tape etc. is 8 or more. The present embodiment becomes furthermore effective as the number of the optical fiber core wires is increased to 12 or more, 16 or more, or 24 or more.

That is, the present embodiment is extremely effective for the intermittently bonded optical fiber ribbon having the large number of the optical fiber core wires 11, the small pitch P between the optical fiber core wires 11, and the small outer diameter of the optical fiber core wire 11.

Furthermore, the radius of curvature R at the center part in the width direction of the convex curved surface of the tension member 9 is preferably larger than R at the end portions in the width direction. Making R at the end portions in the width direction of the tension member 9 smaller in this way improves the effect.

Since an inner diameter of the heat-shrinkable tube 5 after shrinking is approximately between 4 and 6 mm (the radius is between 2 mm and 3 mm, approximately), the radius of curvature of the tension member 9 on the side of the optical fiber core wires 11 is preferably 2 mm or more (80% or more of the inner radius of the heat-shrinkable tube after shrinking), for example. However, R at the end portions in the width direction of the tension member 9 may be less than 2 mm. Making the tension member 9 in a flat shape in this way is effective even when the number of the optical fiber core wires is increased.

It is preferable that the heat-meltable member 7 has an inner long diameter between 3.4 mm and 5 mm, and an inner short diameter between 2.0 mm and 2.5 mm. Also, if the inner long diameter of the heat-meltable member 7 is 5 mm, it is possible to achieve reinforcement of a fusion bonded part of the intermittently bonded optical fiber ribbons 12 having the 24 optical fiber core wires 11 with the pitch between the optical fiber core wires 11 of 200 µm and the outer diameter of the optical fiber core wire 11 of 200 µm.

As above, according to the present embodiment, the tension member 9 has the curved surface on the side of the optical fiber core wires 11, and this can prevent the disarrangement of the optical fiber core wires 11 due to the side pressure. This can suppress a variation in transmission loss in each of the optical fiber core wires 11.

Also, the radius of curvature of the tension member 9 is sufficiently large compared to the diameter of the heat-shrinkable tube 5 after shrinking, and thus the optical fiber core wires 11 can be arranged along the gently curved surface. If the optical fiber core wires 11 are disposed along the tension member having the radius of curvature that is too small, for example, then the transmission loss may increase.

Also, the cross-sectional shape of the tension member 9 is a flat shape in the width direction of the optical fiber tape etc., and thus the tension member 9 has an enough width for the width of the optical fiber tape etc. This can make each of the optical fiber core wires 11 disposed on the gently curved surface, also lowering an overall height of the reinforcing part at the same time.

Figure 4:
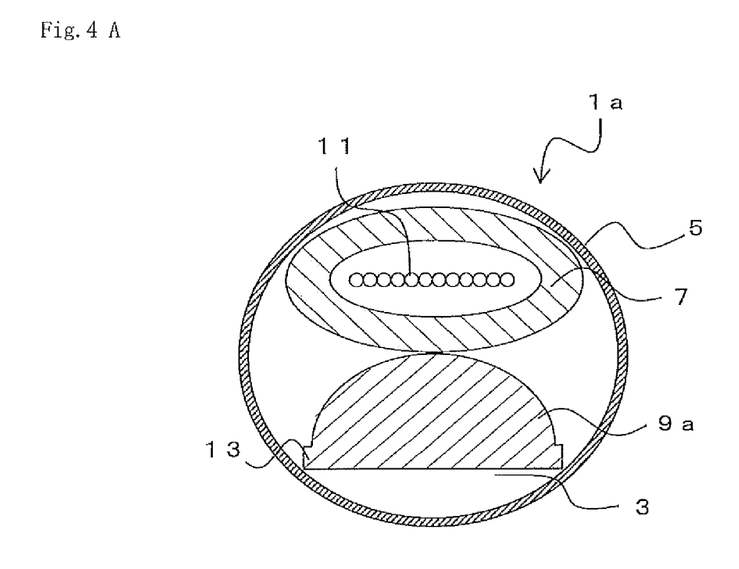
FIG. 4A is a view showing a reinforcement step for the connection part between the optical fiber core wires 11 using a reinforcement sleeve 1a, and is a cross-sectional view of the reinforcement sleeve 1a before shrinking.
FIG. 4B is a view showing a reinforcement step for the connection part between the optical fiber core wires 11 using the reinforcement sleeve 1a, and is a cross-sectional view of the reinforcement sleeve 1a after shrinking.

The shape of the tension member 9 is not limited to the above-mentioned examples. For example, a tension member 9a in a reinforcement sleeve 1a, which is shown in FIG. 4A, may be used. The reinforcement sleeve 1a has the similar structure as the reinforcement sleeve 1, except that the tension member 9a is used. A cross-sectional shape of the tension member 9a is an approximately semi-circular shape having a convex curved surface on a side of the heat-meltable member 7. A convex portion 13 is formed at a lower part of each end portion of the tension member 9a. The convex portion 13 is a part protruding in the width direction at each end portion of the tension member 9a. That is, there is an upward level difference in a proximity of each end portion of the tension member 9a.

FIG. 4B is a cross-sectional view showing a state in which the reinforcement sleeve 1a is shrunk. Forming the convex portions 13 in this way facilitates preventing the heat-meltable member 7 from flowing down beneath the tension member 9a when melted. This enables to keep an amount of the heat-meltable member 7 that is used to press the optical fiber core wires 11 against the tension member 9a constant, and a stable shrunk state can be achieved. Thus, the highly reliable reinforcement structure for the optical fiber connection part can be obtained. Moreover, if the convex portions 13 are formed, the shape of the lower surface of the tension member is unlimited, and may be flat as in the tension member 9a, or elliptic, or may have a convex curved surface, for example. In any case, the tension member 9 is preferably in a flat shape in which the width is larger than the height.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

What is claimed is:

1. A reinforcement sleeve for collectively reinforcing connection parts of a plurality of optical fiber core wires disposed side by side, the reinforcement sleeve comprising:
    a heat-shrinkable tube;
    a heat-meltable member; and
    a tension member, the heat-meltable member and the tension member being inserted into the heat shrinkable tube,
    wherein:
    a surface of the tension member on a side of the heat-meltable member is formed to have a convex curved surface in a cross section perpendicular to a longitudinal direction of the tension member, and
    a radius of curvature of the convex curved surface of the tension member is larger than a radius of curvature of an inner surface of the heat-shrinkable tube.

2. The reinforcement sleeve according to claim 1, wherein a radius of curvature at a center part in a width direction of the convex curved surface of the tension member is larger than a radius of curvature at an end portion in the width direction of the convex curved surface of the tension member.

3. The reinforcement sleeve according to claim 1, wherein a cross-sectional shape of the tension member is elliptical.

4. The reinforcement sleeve according to claim 1, wherein each end portion of the tension member has a convex portion with an upper surface that is flatter than the convex curved surface of the tension member.

5. A reinforcement structure for a connection part of optical fibers using the reinforcement sleeve according to claim 1, wherein:
    the heat-meltable member covers a connection part connecting optical fiber ribbons with each other, the optical fiber ribbons comprising a plurality of optical fiber core wires, which are disposed side by side and bonded at intervals in a longitudinal direction; and
    the plurality of the optical fiber core wires forming the optical fiber ribbon are arranged along the curved surface of the tension member.

6. The reinforcement structure for the connection part of the optical fibers according to claim 5, wherein the number of the plurality of the optical fiber core wires forming the optical fiber ribbon is 12 or more.

7. The reinforcement structure for the connection part of the optical fibers according to claim 5, wherein a pitch between the plurality of the optical fiber core wires is 200 μm or less.

8. The reinforcement structure for the connection part of the optical fibers according to claim 5, wherein an outer diameter of a glass fiber of the optical fiber core wire is 110 μm or less.

9. The reinforcement structure for the connection part of the optical fibers according to claim 5, wherein an outer diameter of the optical fiber core wire is 200 μm or less.

10. A reinforcement method for an optical fiber connection part using the reinforcement sleeve according to claim 1, the method comprising:
    fusion bonding optical fiber ribbons, the optical fiber ribbon comprising a plurality of optical fiber core wires that are disposed side by side and bonded at intervals in a longitudinal direction;
    moving the reinforcement sleeve so as to cover a connection part between the optical fiber ribbons;
    heating the heat-shrinkable tube and the heat-meltable member so as to shrink the heat-shrinkable tube and melt the heat-meltable member at the same time; and
    cooling the plurality of the optical fiber core wires in a state in which the plurality of the optical fiber core wires are arranged along a curved surface of the tension member so that the tension member and the connection part of the plurality of the optical fiber core wires are unified as one body.

11. The reinforcement method for the optical fiber connection part according to claim 10, wherein the number of the plurality of the optical fiber core wires forming the optical fiber ribbon is 12 or more.

12. The reinforcement method for the optical fiber connection part according to claim 10, wherein a pitch between the plurality of the optical fiber core wires is 200 μm or less.

13. The reinforcement method for the optical fiber connection part according to claim 10, wherein an outer diameter of a glass fiber of the optical fiber core wire is 110 μm or less.

14. The reinforcement method for the optical fiber connection part according to claim 10, wherein an outer diameter of the optical fiber core wire is 200 μm or less.

* * * * *